United States Patent
Chen et al.

(10) Patent No.: US 11,777,085 B2
(45) Date of Patent: Oct. 3, 2023

(54) LITHIUM-SUPPLEMENT LAYER AND ITS NEGATIVE ELECTRODE SHEET, LITHIUM ION BATTERY AND DEVICE

(71) Applicant: Contemporary Amperex Technology Co., Limited, Ningde (CN)

(72) Inventors: Shitong Chen, Ningde (CN); Bin Xie, Ningde (CN); Zhijie Gong, Ningde (CN); Zhao Hu, Ningde (CN); Lin Ma, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 362 days.

(21) Appl. No.: 17/057,290

(22) PCT Filed: Apr. 7, 2020

(86) PCT No.: PCT/CN2020/083448
§ 371 (c)(1),
(2) Date: Nov. 20, 2020

(87) PCT Pub. No.: WO2020/207368
PCT Pub. Date: Oct. 15, 2020

(65) Prior Publication Data
US 2021/0210750 A1    Jul. 8, 2021

(30) Foreign Application Priority Data
Apr. 11, 2019   (CN) .......................... 201910287520.8

(51) Int. Cl.
*H01M 4/36*      (2006.01)
*H01M 10/0525*   (2010.01)
*H01M 4/02*      (2006.01)

(52) U.S. Cl.
CPC ....... *H01M 4/366* (2013.01); *H01M 10/0525* (2013.01); *H01M 2004/027* (2013.01)

(58) Field of Classification Search
CPC ............ H01M 4/366; H01M 10/0525; H01M 2004/027; H01M 4/139; H01M 4/24;
(Continued)

(56) References Cited

U.S. PATENT DOCUMENTS 6,371,995 B1 *   4/2002  Yasunami .........  H01M 10/0587
                                                    429/324
2005/0084758 A1  4/2005  Yamamoto et al.
(Continued)

FOREIGN PATENT DOCUMENTS

CN     102522528 A    6/2012
CN     103401016 A   11/2013
(Continued)

OTHER PUBLICATIONS

CN 108878775, Wu Cheng (machine translation) (Year: 2018).*
(Continued)

*Primary Examiner* — Brian R Ohara
(74) *Attorney, Agent, or Firm* — Kilpatrick Townsend & Stockton LLP

(57) ABSTRACT

The application relates to the field of lithium ion battery technology and, more particularly, relates to a lithium-supplement layer and its negative electrode sheet, a lithium ion battery and a device. The lithium-supplement layer is formed by connecting a transition layer, an oxide layer and a surface layer in sequence, the surface layer contains an appropriate amount of an organic material and a filling substance, which can reduce a winding temperature of the negative electrode sheet, the oxide layer substance in the lithium-supplement layer is used to provide an additional lithium source, after injection, the lithium source can be continuously supplemented during the cycle process to improve the activity of a lithium layer, at the same time, the filling substance contained in the surface layer can effec- (Continued)

tively play a role of restraining the expansion of an active substance, and improve the battery cycle performance.

14 Claims, 3 Drawing Sheets

(58) Field of Classification Search
CPC .... H01M 4/26; H01M 50/209; H01M 50/249; H01M 10/052; H01M 4/131; Y02E 60/10
See application file for complete search history.

(56) References Cited

U.S. PATENT DOCUMENTS

| | | |
|---|---|---|
| 2014/0329150 A1 | 11/2014 | de Guzman |
| 2017/0158903 A1 | 6/2017 | Mattis et al. |

FOREIGN PATENT DOCUMENTS

| | | |
|---|---|---|
| CN | 204651393 U | 9/2015 |
| CN | 105702913 A | 6/2016 |
| CN | 105932206 A | 9/2016 |
| CN | 106384808 A | 2/2017 |
| CN | 107039633 A | 8/2017 |
| CN | 107107527 A | 8/2017 |
| CN | 107819113 A | 3/2018 |
| CN | 107959010 A | 4/2018 |
| CN | 108134088 A | 6/2018 |
| CN | 108373908 A | 8/2018 |
| CN | 108878775 A | 11/2018 |
| CN | 108886139 A | 11/2018 |
| CN | 109103419 A | 12/2018 |
| CN | 109244355 A | 1/2019 |
| JP | 2004-087251 A | 3/2004 |

OTHER PUBLICATIONS

Chinese Office Action dated Apr. 25, 2021, in connection with corresponding CN Application No. 201910287520.8 (9pp.).
Written Opinion dated Jun. 30, 2020 in corresponding International Application PCT/CN2020/083448; 7 pages.
The Extended European Search Report dated Aug. 9, 2021, including the Supplementary European Search Report and the European Search Opinion, in connection with corresponding EP Application No. 20788415.6 (7pp.).
Chinese Office Action dated Jul. 19, 2021, in connection with corresponding CN Application No. 201910287520.8 (9pp.).
International Search Report dated Jun. 30, 2020 in corresponding International application No. PCT/CN2020/083448; 5 pages.
First Search of priority Chinese Application 201910287520.8, 2 pages.
Supplementary Search of priority Chinese Application 201910287520.8, 2 pages.

\* cited by examiner

LITHIUM-SUPPLEMENT LAYER AND ITS NEGATIVE ELECTRODE SHEET, LITHIUM ION BATTERY AND DEVICE

CROSS-REFERENCE TO RELATED APPLICATIONS

This application is a National Stage of International Application No. PCT/CN2020/083448, filed on Apr. 7, 2020, which claims priority to Chinese Patent Application No. 201910287520.8, filed on Apr. 11, 2019. The disclosures of the aforementioned applications are hereby incorporated by reference in their entireties.

TECHNICAL FIELD

The application relates to the field of lithium ion batteries technology and, more particularly, relates to a negative electrode lithium-supplement layer and its negative electrode sheet, a lithium ion battery and a device.

BACKGROUND

Lithium ion batteries are widely used in the field of portable power due to their high energy density and long cycle life. However, with the development of electric vehicles, unmanned aerial vehicles and others applications in the field of large-scale mobile power, the development of higher energy density lithium ion batteries is currently a major issue that needs to be solved urgently.

During the first charge of the battery, a solid electrolyte interphase (SEI) film formed on the surface of the negative electrode will consume a large amount of lithium source, and convert lithium into inactive lithium-containing compounds such as lithium carbonate, lithium fluoride and alkyl lithium, resulting in the loss of recyclable lithium, and reducing the first-cycle coulombic efficiency and battery capacity. In a battery system using graphite negative electrode, the first charge will consume about 10% of the lithium source, and the first coulombic efficiency is about 90%. When using high specific volume negative electrode materials, such as alloys (silicon, tin, and aluminum), oxides (silicon oxide, tin oxide, titanium oxide) and amorphous carbon, the consumption of lithium sources is further exacerbated. Therefore, in order to further improve the energy density of lithium ion batteries, it is a common method to improve cycle performance and improve battery energy density by pre-lithiation and other technologies. At present, a lithium-supplement way is thinning and attaching a lithium foil to the surface of the electrode sheet by rolling. However, this process will cause two problems: 1, the lithium layer is adhered to the surface of the electrode sheet (negative/positive electrode) after rolling, due to the exothermic reaction between side reactants embedded in the active substance of the electrode sheet and the oxygen in the air, the temperature of the electrode sheet increases during the electrode sheet manufacturing process, causing a safety risk to production; 2, for the electrode sheet made of silicon-based/tin-based and other new active substances, the silicon-based itself expands during the cycling process and SEI film becomes unstable, which leads to poor cycle performance.

SUMMARY

In view of the above problems in the background art, the purpose of the present application is to provide a lithium-supplement layer of lithium ion battery electrode sheet and its negative electrode sheet, a lithium ion battery and a device. The lithium-supplement layer needs to be able to improve the heat generation problem of the lithium-supplementary electrode sheet of the lithium ion battery, and to form a protective layer on the surface of the SEI film of active substance layer of the electrode sheet, to suppress the cracking of the SEI film of the active substance layer, and to improve the performance of the lithium ion battery.

In order to achieve the above purpose, in a first aspect of the present application, the inventor provides a lithium-supplement layer, including: a transition layer, an oxide layer and a surface layer connected in sequence, where, the surface layer is a layered covering or a dotted covering, and the surface layer contains an organic material and a filling substance.

In a second aspect of present application, inventor provides a lithium-supplement negative electrode sheet, including: a current collector; a diaphragm, located on the current collector and comprising an active substance, an adhesive and a conductive agent; and the lithium-supplement layer described in the first aspect of the present application, where, the transition layer in the lithium-supplement layer is connected with the diaphragm.

In a third aspect of present application, inventor provides a lithium-supplement lithium ion battery, including the negative electrode sheet described in the second aspect of the present application, a positive electrode sheet, an electrolyte and a separator.

In a fourth aspect of the present application, the inventor provides a device, the device includes the lithium ion battery of the third aspect of the present application.

Compared with the prior art, this application includes at least the following beneficial effects:

the lithium-supplement layer of the present application is formed by connecting a transition layer, an oxide layer and a surface layer in sequence, the surface layer contains an appropriate amount of the organic material and the filling substance, which can reduce a winding temperature of the negative electrode sheet, the oxide layer substance in the lithium-supplement layer is used to provide an additional lithium source, after injection, the lithium source can be continuously supplemented during the cycle process to improve the activity of the lithium layer, at the same time, the filling substance contained in the surface layer can effectively play a role of restraining the expansion of the active substance, and improve the battery cycle performance, the substance components in the transition layer can be used as an inorganic SEI film to suppress lithium source consumption caused by expansion of the active substance.

BRIEF DESCRIPTION OF DRAWINGS

In order to illustrate more clearly the technical solutions of the embodiments of the present application, the drawings that need to be used in the embodiments of the present application will be briefly introduced in the following, obviously, the drawings described below are only some examples of the present application, and other drawings can be obtained by those skilled in the art without creative work.

DESCRIPTION OF EMBODIMENTS

Figure 1:
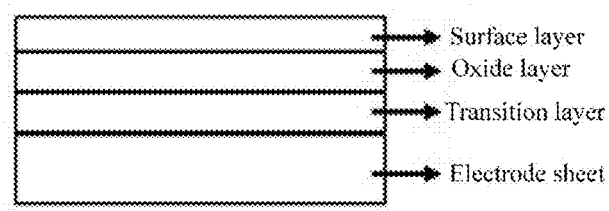
FIG. 1 is a schematic diagram of an electrode sheet of a layered covering lithium-supplement layer of a specific embodiment.

In order to make the purpose, technical solutions and advantages of the embodiments of the present application clearer, the technical solutions of the embodiments of the present application will be described clearly and completely in conjunction with the drawings in the embodiments of the present application, obviously, the described embodiments are part of the embodiments of this application, rather than all of the embodiments. Based on the embodiments in the present application, all other embodiments obtained by those skilled in the art without creative work all fall within the protection scope of the present application.

The lithium-supplement layer, the lithium-supplement negative electrode sheet, and the lithium ion battery and device of the present application will be described in detail below.

Firstly, the lithium-supplement layer of the first aspect of the present application is described, which includes a transition layer, an oxide layer and a surface layer connected in sequence, wherein, the surface layer is a layered covering or a dotted covering, and the surface layer contains an organic material and a filling substance. Generally, "connected" here can be understood as overlapped along the thickness direction.

The transition layer in the lithium-supplement layer is a side reactant between the active substance and the lithium-supplement layer, which can be regarded as an inorganic SEI film additionally generated in the lithium-supplement electrode sheet, and can play a role of protecting the SEI film formed by the active substance itself, and can effectively solve the problem that the lithium ions in the electrolyte would be consumed due to expansion and cracking of active substance during the cycle process.

The main components of the oxide layer are lithium metal and lithium metal oxides, nitrides and hydroxide. The oxide layer is used to provide an additional lithium source, after injection, the lithium source can be continuously supplemented during the cycle process to improve the battery cycle performance. The oxide layer substance can also provide a part of substance that is used to form a transition layer, which is, additionally forming a layer of inorganic SEI film to improve the battery cycle performance. The oxide layer substance can form a dense or sparse isolation layer on the surface of the electrode sheet, to further improve the problem that the winding temperature of the lithium-supplement electrode sheet would be increased due to the reaction between the lithium foil and the air/active substance.

The organic material in the surface layer mainly uses alcohols, esters and fatty acids. And the main roles of the organic material lie in: as a carrier of the filling substance to form a slurry coated on the surface of the lithium foil, as a film-forming substance of the surface layer of the lithium-supplement layer, so that the surface layer can form a film or evenly distributed on the surface of the transition layer and the oxide layer of the lithium-supplement layer. The filling substance in the lithium-supplement layer can be used to improve the deterioration of the cell internal resistance caused by the side reaction between the organic material and the electrolyte. The filling substance can form a network structure or a film-forming structure with the organic material, which can solve the expansion problem of the electrode sheet during the cycle process of active substance. The distribution form of the surface layer on the oxide layer can be uniformly layered covering or dotted covering.

Optionally, the organic material is one or more selected from stearic acid, 12-hydroxystearic acid, fatty acid metal salt, polyglycol, polyhydrocarbon cyclopentane, polyisobutyl methacrylate, phosphate ester, paraffin, polyurea, poly α-olefins, alkyl naphthalene and polydimethylsiloxane, the filling substance is one or more selected from graphite, graphene, aluminum oxide, sodium hydroxide, lithium hydroxide, calcium hydroxide and molybdenum disulfide.

Optionally, the transition layer is selected from an Li oxide or an embedded compound of lithium, for example, one or more selected from $Li_2O$, $Li_xC$, and $Li_{x1}Si_y$, where $0<x\leq2$, $0<x1\leq4.4$, $0<y\leq2$. If choosing embedded silicide of lithium, it may generally be $Li_{x1}Si$, x1 may be 4.4, 3.75, 3.25, 2.33, etc. More optionally, the oxide layer is one or more selected from Li metal, $Li_2O$, LiF, LiOH, $Li_3N$, and $Li_2CO_3$.

Furthermore, a content and ratio of the organic material and filling substance in the surface layer of the lithium-supplement layer have a certain influence on the performance of the electrode sheet and lithium ion battery. When the proportion of the organic material in the surface layer is high, although it is helpful to form the isolation layer on the surface of the lithium-supplement layer, thereby lowering the winding temperature of the lithium-supplement electrode sheet, and improving the activity of the lithium-supplement layer, however, a very high proportion of organic materials may cause: a, the isolation layer formed by the lithium-supplement layer is too dense, which affects the lithium ion transmission efficiency, resulting in an increase of the battery internal resistance, affecting the battery performance; b, the lithium-supplement layer contains alcohols and other materials, if the proportion of organic materials is too high, side products is easily to be formed by reaction with the electrolyte, and affecting the battery performance; c. filling substance is too little, and cannot play a role of restraining the expansion of the active substance during the cycle process, thereby affecting the battery performance.

Optionally, based on a quality of the surface layer, the content of the organic material is 10%-97%, optionally 20%-80%; the content of the filling substance is 3%-90%, optionally 20%-80%.

When the proportions of the organic material and filling substance in the surface layer of the lithium-supplement layer are the same, the thickness of the surface layer is too small, for example, the thickness of the surface layer is 0 μm-0.1 μm, although it may also have a certain isolation effect, however, this surface layer cannot form an effective isolation layer on the surface of the lithium-supplement layer, and resulting in an increase of the reaction area between the lithium layer and the air, which accelerates the reaction, the temperature during winding process of lithium-supplement electrode sheet exceeds the standard, causing production safety risks. At the same time, an over high temperature of the electrode sheet will reduce the activity of the lithium layer, a part of lithium layers will form dead lithium under high temperature conditions, and cannot be used to provide capacity, resulting in a significant impact on electrical performance, and reducing cycle performance. On the other hand, when the thickness of the surface layer is too thick, for example, the thickness of the surface layer is greater than 15 μm, although the thick surface layer can form an excellent isolation layer to the air on the surface of the lithium-supplement layer, and effectively reducing the winding temperature of the lithium-supplement electrode sheet, however, the surface layer is too thick, which will directly affect the transmission efficiency of lithium ions, thus, the obtained cell internal resistance increases, and its cycle performance decreases. When the thickness of the surface layer of the lithium-supplement layer is in the range of 0.1 μm-15 μm, the surface layer can form an isolation layer between the lithium-supplement layer and the air, at the same time, the transmission efficiency of lithium ions cannot be significantly affected, and as the winding temperature of the lithium-supplement electrode sheet is controllable, the activity of the lithium-supplement layer can be guaranteed to provide capacity, and to improve the performance of the lithium ion battery.

Optionally, the thickness of the surface layer is 0.1 μm-15 μm, optionally 1 μm-8 μm.

The transition layer is too thin, that is, the inorganic SEI film formed on the lithium-supplement electrode sheet is too thin, although the performance of the electrode sheet can be improved to a certain extent, it cannot really play a protection role for the expansion of the active substance layer itself, and the improvement of the cell performance is not obvious. However, the transition layer is too thick, although it can play a good protection role for the expansion of active substance layer, it may affect the direct transmission efficiency of lithium ions in the positive and negative electrode sheets, further affects the battery performance.

Optionally, the thickness of the transition layer is 0.01 μm-1 μm, optionally, 0.05 μm-0.7 μm.

The inventor further studied and found that if the thickness of the oxide layer is too thin, that is, under the same amount of lithium-supplement, the lithium layer is pressed to the thinnest, and can be considered that most of the lithium layer is directly pressed into the active substance layer, under this circumstance, the active substance of the electrode sheet reacts violently with the substance in the lithium-supplement layer, the heat generated is more obvious, and the winding temperature of the electrode sheet increases greatly, which affects the safety of manufacturing, at the same time, the increase of winding temperature of the electrode sheet directly affects the activity of the oxide layer substance, and affects the battery cycle performance. On the contrary, if the thickness of the oxide layer is too thick, that is, under the same amount of lithium-supplement, the lithium layer rarely contacts with the active substance on the surface of the electrode sheet, under this circumstance, due to the oxide layer of the lithium-supplement layer rarely reacts with the active substance, the winding temperature of the lithium-supplement electrode sheet decreases; at the same time, due to the thickness of the oxide layer is too thick, it will directly affect the efficiency of the oxide layer of the lithium-supplement layer embedded into the active substance, even under the circumstance of liquid injection, due to the ions channels and electron channels between the oxide layer and the active substance layer are too few (the contact area between the oxide layer and the active substance layer is small), and the contact area between the oxide layer and the active substance layer is small, causing the thickness of the transition layer in the lithium-supplement layer is difficult to achieve an optimal window, thereby, affecting the battery cycle performance to a certain extent.

Optionally, the thickness of the oxide layer is 0.5 μm-20 μm, optionally, 0.8 μm-10 μm.

Secondly, a lithium-supplement negative electrode sheet of the second aspect of the present application is described, which includes: a current collector; a diaphragm, located on the current collector and including an active substance, an adhesive, and a conductive agent; and the lithium-supplement layer described in the first aspect of the present application, where, the transition layer in the lithium-supplement layer is connected with the diaphragm.

A third aspect of the present application proposes a lithium-supplement lithium ion battery, which includes: the negative electrode sheet described in the second aspect of the present application, a positive electrode sheet, an electrolyte, and a separator.

Figure 4:
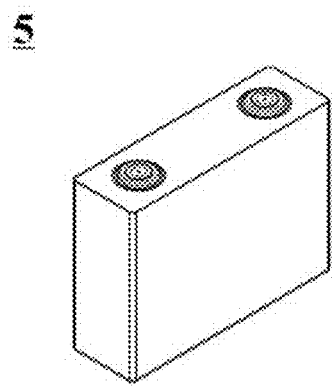
FIG. 4 is a schematic diagram of a lithium ion battery of a specific embodiment.

The present application has no particular limitation on the shape of the lithium ion battery, which may be cylindrical, square, or any other shapes. FIG. 4 is an example of a lithium ion battery 5 with a square structure.

In some embodiments, lithium ion battery may be assembled into a battery module, and the number of lithium ion batteries contained in the battery module may be multiple, and the specific number may be adjusted according to the application and capacity of the battery module.

Figure 5:
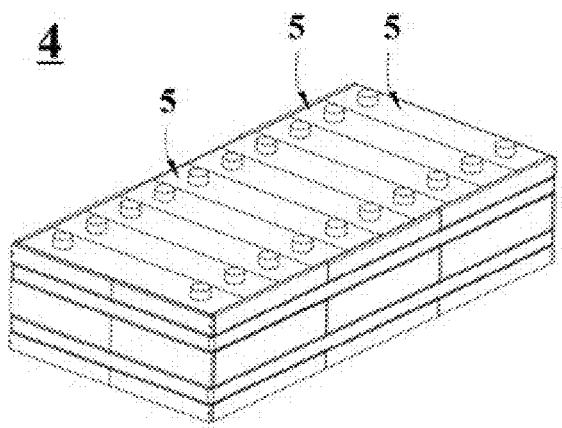
FIG. 5 is a schematic diagram of a battery module of a specific embodiment.

FIG. 5 is an example of a battery module 4. Referring to FIG. 5, in the battery module 4, a plurality of lithium ion batteries 5 may be arranged in sequence along the length direction of the battery module 4. Of course, also it is possible to arrange them in any other arbitrary manner. Furthermore, a plurality of lithium ion batteries 5 may be secured by fasteners.

Optionally, battery module 4 may further include a housing with an accommodation space, and a plurality of lithium ion batteries 5 are accommodated in the accommodation space.

In some embodiments, the above battery modules can also be assembled into a battery pack, and the number of battery modules contained in the battery pack can be adjusted according to the application and capacity of the battery pack.

Figure 6:
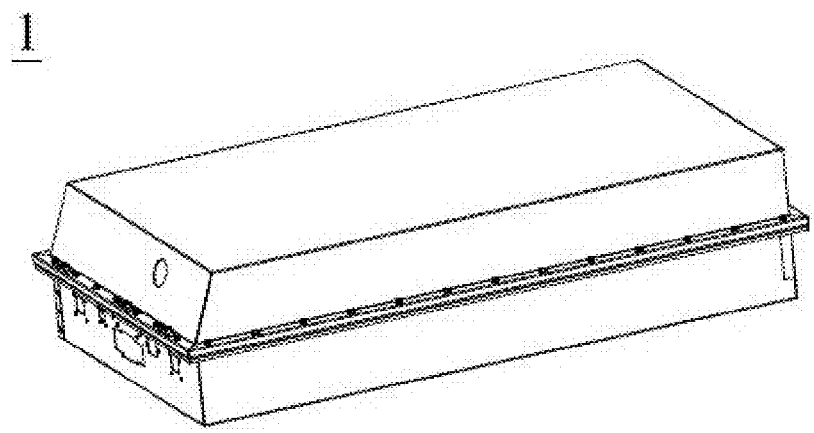
FIG. 6 is a schematic diagram of a battery pack of a specific embodiment.
Figure 7:
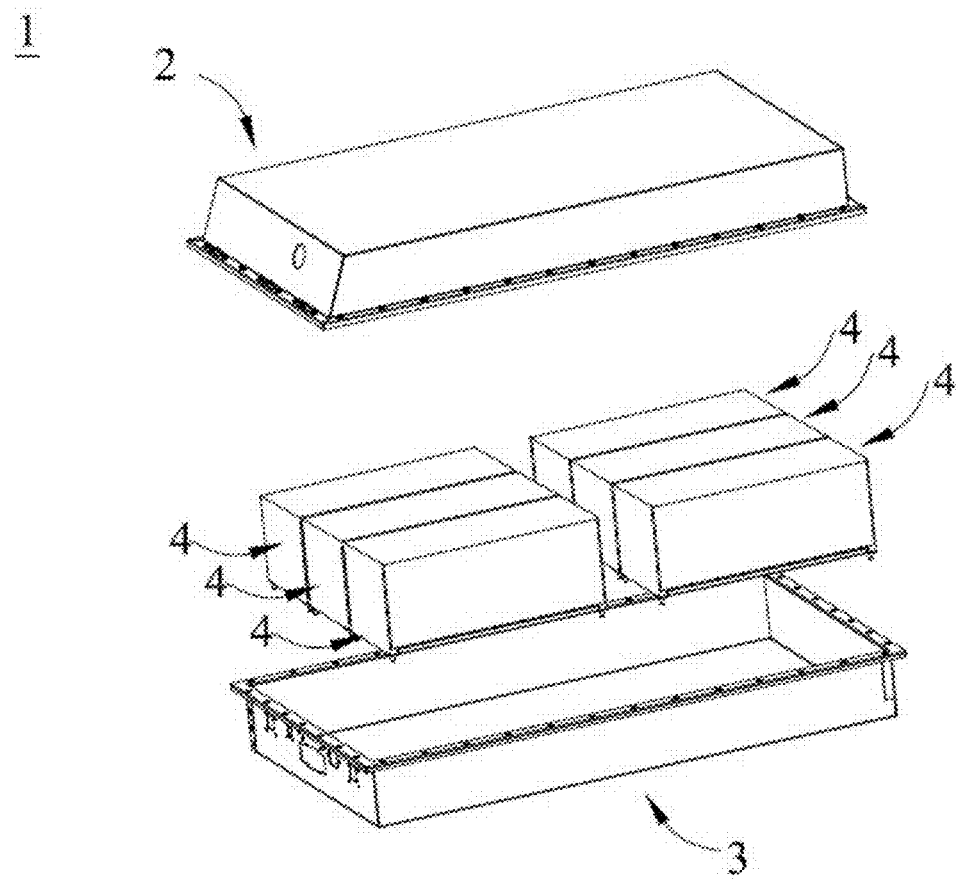
FIG. 7 is an exploded view of FIG. 6.

FIG. 6 and FIG. 7 are illustrated as examples of battery packs 1. Referring to FIG. 6 and FIG. 7, the battery pack 1 may include a battery box and a plurality of battery modules 4 that are installed in the battery box. The battery box includes an upper case 2 and a lower case 3, the upper case 2 can be covered on the lower case 3, and forming an enclosed space for accommodating the battery module 4. A plurality of battery modules 4 can be arranged in the battery box in any other arbitrary manner.

A fourth aspect of the present application provides a device, the device includes the lithium ion battery of the third aspect of the present application. The lithium ion battery provides power to the device, and may also serve as an energy storage unit of the device. The device may be, but not limited to, mobile equipment (such as mobile phone, notebook computer, etc.), electric vehicles (such as pure electric vehicle, hybrid electric vehicle, plug-in hybrid electric vehicle, electric bicycle, electric scooter, electric golf balls vehicle, electric truck, etc.), electric train, ship and satellite, energy storage system, etc.

The device may select a lithium ion cell (Cell), a battery module (Module), or a battery pack (Pack) according to its usage requirement.

Figure 8:
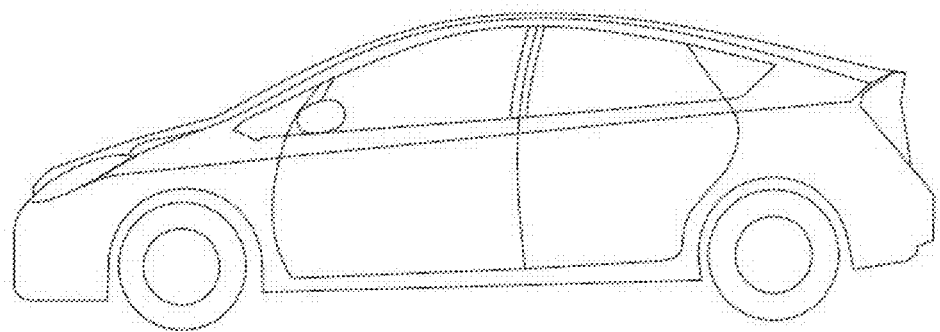
FIG. 8 is a schematic diagram of a device using a lithium ion battery as a power of a specific embodiment.

FIG. 8 is an example of a device. The device is a pure electric vehicle, a hybrid electric vehicle, or a plug-in hybrid electric vehicle, etc. In order to meet the requirement of the device for high power and high energy density of lithium ion battery, a battery pack or a battery module may be used.

As another example, the device may be a mobile phone, a tablet computer, a notebook computer, etc. The device usually requires lightness and thinness, which may use a lithium ion battery as a power.

In order to explain the technical content, structural feature, achieved purpose and effects of the technical solution in detail, the following is a detailed description with reference to specific embodiments and drawings. It should be understood that these embodiments are only used to illustrate the present application and are not intended to limit the scope of the present application.

The battery of examples 1-28 and comparative examples 1-4 are prepared according to the following methods.

(1) Manufacturing Method of the Negative Electrode Sheet Containing the Lithium-Supplement Layer Referring to FIG. 1, the lithium foil band with a thickness of 5000 μm is rolled by two rolling rollers to obtain ultra-thin lithium foil bands with different thicknesses, and then the ultra-thin lithium foil bands with different thicknesses in accordance with the parameters in Table 1 and the electrode sheet coated with the active substance are rolled by two calendering rollers, and the ultra-thin lithium foil bands with different thicknesses are adhered to the surface of the electrode sheet by rolling, thereby transition layers with different thickness are obtained. Then, uniformly coating the surface of the electrode sheet with ultra-thin lithium foil bands adhered thereto with oxide layer (comparative example 2 without oxide layer) and surface layer (comparative example 1 without surface layer) in sequence according to the parameters shown in Table 1, and weight of the lithium-supplement layer is 10 mg/1540.25 mm² single-sided active substance surface, so double-sided active substance surface is 20 mg/1540.25 mm².

(2) Manufacturing Method of the Positive Electrode Sheet

Mixing the positive electrode active material $LiNi_{1/3}Co_{1/3}Mn_{1/3}O_2$, conductive agent Super-P, adhesive PVDF together according to the mass ratio of 94:3:3, adding the solvent NMP, and stirring under the action of a vacuum stirrer until the system is uniform, a positive electrode slurry is obtained; uniformly coating the positive electrode slurry on the two surfaces of the positive electrode current collector aluminum foil, after drying at room temperature, transferred to an oven for further drying, then subjected to cold pressing and slitting, a positive electrode sheet is obtained.

(3) Preparation of the Electrolyte

Mixing ethylene carbonate (EC) and ethyl methyl carbonate (EMC) together at a volume ratio of 3:7 to obtain an organic solvent, and then dissolving the fully dried $LiPF_6$ in the mixed organic solvent to prepare an electrolyte with a concentration of 1 mol/L.

(4) Preparation of a Separator Film

Selecting the PE/PP/PE three-layer porous polymer film as the separator film.

(5) Preparation of the Lithium Ion Battery

Stacking the above positive electrode sheet, separator film, and negative electrode sheet containing lithium-supplement layer in order, so that the separator film is between the positive and negative electrode sheets and plays a role of isolation, and then winding to obtain a bare cell; placing the bare cell in the outer packaging shell, after drying, injecting the electrolyte, and subjected to vacuum packaging, standing, forming, shaping and other processes, a lithium ion battery is obtained.

Then, the test method of the temperature of the lithium-supplement electrode sheet and the test methods of the internal resistance and cycle performance of the lithium ion battery are illustrated.

(1) Temperature test of electrode sheet, winding the lithium-supplement electrode sheet with a 6-inch reel for 1000 m, inserting a temperature sensing line at the winding position of 500 m to test the temperature of electrode sheet, the temperature measuring instrument is: thermometer: SKF TKDT 10, the temperature specification is ≤60° C.

(2) Battery internal resistance test: that is, AC resistance, AC internal resistance equipment: Itech company IT5100 series battery internal resistance tester, test method: adding a fixed frequency 1 KHz and a fixed current 50 mA on the test cell, sampling the voltage, and calculating the resistance value by the rectifier instrument.

(3) Cycle test: using lithium ion charge and discharge equipment: Xinwei mobile power product special tester (6V4A) repeatedly charges and discharges the battery until the capacity decay rate reaches 80%, the above cell capacity is 4.2 Ah, charge and discharge of the cell repeatedly using 1 C current rate (that is, the current is 4.2 Ah), charging the cell to a voltage of 4.2V at a current rate of 1 C, and then discharging the cell to a voltage of 2.5V at a current rate of 1 C, recording the charge and discharge as one cycle; when the cell capacity decays to 3.36 Ah, stopping the test, and recording the repeated times of charge and discharge, that is, the data of cycle performance of the cell, and the qualified number of cycle times is ≥700 times.

The relevant parameters of the lithium-supplement layers provided by examples 1-28 and comparative examples 1-4 are shown in Table 1, and the performance test results of the lithium ion batteries prepared by examples 1-28 and comparative examples 1-4 are shown in Table 2.

TABLE 1 relevant parameters of the lithium-supplement layers provided by examples 1-28 and comparative examples 1-4

| sample | surface layer | | | | the thickness of surface layer/ μm | the thickness of Lithium foil/ μm | Transition layer | the thickness of transition layer/ μm | oxide layer | the thickness of oxide layer/ μm |
|---|---|---|---|---|---|---|---|---|---|---|
| | organic material | the content of organic material | filling substance | the content of filling substance | | | | | | |
| example 1 | stearic acid | 4% | graphene | 96% | 4 | 4 | $Li_2O$ | 1 | $Li_2O$ | 2 |
| example 2 | stearic acid | 10% | graphene | 90% | 4 | 4 | $Li_2O$ | 1 | $Li_2O$ | 2 |
| example 3 | stearic acid | 20% | graphene | 80% | 4 | 4 | $Li_2O$ | 1 | $Li_2O$ | 2 |
| example 4 | stearic acid | 50% | graphene | 50% | 4 | 4 | $Li_2O$ | 1 | $Li_2O$ | 2 |

TABLE 1-continued relevant parameters of the lithium-supplement layers provided by examples 1-28 and comparative examples 1-4

| sample | surface layer | | | | the thickness of surface layer/ μm | the thickness of Lithium foil/ μm | Transition layer | the thickness of transition layer/ μm | oxide layer | the thickness of oxide layer/ μm |
| --- | --- | --- | --- | --- | --- | --- | --- | --- | --- | --- |
| | organic material | the content of organic material | filling substance | the content of filling substance | | | | | | |
| example 5 | stearic acid | 80% | graphene | 20% | 4 | 4 | Li$_2$O | 1 | Li$_2$O | 2 |
| example 6 | stearic acid | 97% | graphene | 3% | 4 | 4 | Li$_2$O | 1 | Li$_2$O | 2 |
| example 7 | 12-Hydroxy-stearic acid | 20% | graphene | 80% | 4 | 4 | Li$_2$O | 1 | Li$_2$O | 2 |
| example 8 | polyglycol | 20% | graphene | 80% | 4 | 4 | Li$_2$O | 1 | Li$_2$O | 2 |
| example 9 | phosphate | 20% | graphene | 80% | 4 | 4 | Li$_2$O | 1 | Li$_2$O | 2 |
| example 10 | polyisobutyl methacrylate | 20% | graphene | 80% | 4 | 4 | Li$_2$O | 1 | Li$_2$O | 2 |
| example 11 | stearic acid | 80% | sodium hydroxide | 20% | 4 | 4 | Li$_2$O | 1 | Li$_2$O | 2 |
| example 12 | stearic acid | 80% | aluminum oxide | 20% | 4 | 4 | Li$_2$O | 1 | Li$_2$O | 2 |
| example 13 | stearic acid | 80% | molybdenum disulfide | 20% | 4 | 4 | Li$_2$O | 1 | Li$_2$O | 2 |
| example 14 | stearic acid | 80% | graphene | 20% | 4 | 4 | Li$_2$C | 1 | LiOH | 2 |
| example 15 | stearic acid | 80% | graphene | 20% | 4 | 4 | Li$_2$C | 1 | Li$_3$N | 2 |
| example 16 | stearic acid | 80% | graphene | 20% | 4 | 4 | Li$_2$C | 1 | Li | 2 |
| example 17 | stearic acid | 80% | graphene | 20% | 0.1 | 4 | Li$_2$O | 1 | Li$_2$O | 2 |
| example 18 | stearic acid | 80% | graphene | 20% | 1 | 4 | Li$_2$O | 1 | Li$_2$O | 2 |
| example 19 | stearic acid | 80% | graphene | 20% | 5 | 4 | Li$_2$O | 1 | Li$_2$O | 2 |
| example 20 | stearic acid | 80% | graphene | 20% | 8 | 4 | Li$_2$O | 1 | Li$_2$O | 2 |
| example 21 | stearic acid | 80% | graphene | 20% | 4 | 2 | Li$_2$O | 0.01 | Li$_2$O | 2 |
| example 22 | stearic acid | 80% | graphene | 20% | 4 | 2.5 | Li$_2$O | 0.05 | Li$_2$O | 2 |
| example 23 | stearic acid | 80% | graphene | 20% | 4 | 3 | Li$_2$O | 0.7 | Li$_2$O | 2 |
| example 24 | stearic acid | 80% | graphene | 20% | 4 | 2 | Li$_2$O | 1 | Li$_2$O | 0.5 |
| example 25 | stearic acid | 80% | graphene | 20% | 4 | 2.5 | Li$_2$O | 1 | Li$_2$O | 0.8 |
| example 26 | stearic acid | 80% | graphene | 20% | 4 | 7 | Li$_2$O | 1 | Li$_2$O | 5 |
| example 27 | stearic acid | 80% | graphene | 20% | 4 | 12 | Li$_2$O | 1 | Li$_2$O | 10 |
| example 28 | stearic acid | 80% | graphene | 20% | 4 | 24 | Li$_2$O | 1 | Li$_2$O | 20 |
| comparative example 1 | / | / | / | / | / | 4 | Li$_2$O | 1 | Li$_2$O | 2 |
| comparative example 2 | stearic acid | 80% | graphene | 20% | 4 | / | / | / | / | / |
| comparative example 3 | stearic acid | 100% | / | / | 4 | 4 | Li$_2$O | 1 | Li$_2$O | 2 |
| comparative example 4 | / | / | graphene | 100% | 4 | 4 | Li$_2$O | 1 | Li$_2$O | 2 |

TABLE 2 battery heating temperature, internal resistance and cycle performance test results provided by examples 1-28 and comparative examples 1-4

| sample | heating temperature of electrode sheet (° C.) | internal resistance (mOHM) | cycle performance (circle) |
|---|---|---|---|
| example 1 | 45 | 5.64 | 700 |
| example 2 | 43 | 5.68 | 725 |
| example 3 | 41 | 5.71 | 730 |
| example 4 | 41 | 5.75 | 730 |
| example 5 | 39 | 5.80 | 725 |
| example 6 | 37 | 5.91 | 710 |
| example 7 | 40 | 5.75 | 735 |
| example 8 | 41 | 5.90 | 720 |
| example 9 | 42 | 5.77 | 725 |
| example 10 | 40 | 5.71 | 740 |
| example 11 | 40 | 5.84 | 715 |
| example 12 | 39 | 5.78 | 725 |
| example 13 | 39 | 5.82 | 730 |
| example 14 | 38 | 5.76 | 740 |
| example 15 | 39 | 5.84 | 715 |
| example 16 | 41 | 5.78 | 725 |
| example 17 | 44 | 5.68 | 720 |
| example 18 | 43 | 5.72 | 740 |
| example 19 | 41 | 5.81 | 720 |
| example 20 | 36 | 5.96 | 705 |
| example 21 | 41 | 5.78 | 720 |
| example 22 | 40 | 5.75 | 730 |
| example 23 | 38 | 5.85 | 710 |
| example 24 | 45 | 5.71 | 705 |
| example 25 | 44 | 5.73 | 715 |
| example 26 | 42 | 5.82 | 725 |
| example 27 | 38 | 5.89 | 705 |
| example 28 | 34 | 5.96 | 700 |
| comparative example 1 | 101 | 5.60 | 600 |
| comparative example 2 | 21 | 5.80 | 420 |
| comparative example 3 | 37 | 6.10 | 650 |
| comparative example 4 | 45 | 5.64 | 660 |

From the data in Table 1 and Table 2, it can be seen that there is no surface layer in lithium-supplement layer (comparative example 1), that is, a conventional lithium-supplement layer, which includes a transition layer and an oxide layer. Since there is no surface layer to block the oxidation layer substance in the lithium-supplement layer from continuing to react with the air, the reaction is an exothermic reaction, resulting in production safety problems such as an over high temperature of the lithium-supplement electrode sheet during the winding process, at the same time, the over high temperature of the electrode sheet which will directly affect the activity of the lithium layer, and ultimately affect the electrical performance. There is a surface layer in the lithium-supplement layer (example 5), which forms an isolation layer between lithium-supplement layer and air, at the same time, it will not significantly affect the transmission efficiency of lithium ions; furthermore, due to the winding temperature of the lithium-supplement electrode sheet is controllable, the activity of the lithium-supplement layer can be guaranteed to provide capacity and improve the performance of the lithium ion battery.

Similarly, from the data in Table 1 and Table 2, it can be seen that the lithium-supplement layer only has a surface layer (comparative example 2), that is, there is no transition layer and oxide layer, that is, there is no lithium layer for providing capacity on the surface of the electrode sheet, and cannot provide additional lithium ions during the cycle process, thereby affecting the cycle electrical performance of the lithium ion battery; the phenomenon that the transition layer/oxide layer reacting with air and active substance is not exist, and the winding temperature of the electrode sheet is not increased.

By observing the data of comparative examples 1-4 and examples 1-6 in Table 1 and Table 2, it can be seen that the ratio relationship between the organic material and the filling substance has a certain influence on the battery performance.

When the proportion of organic material in a coating is too small (the proportion of filling substance is too large), for example, the ratio of organic material to filling substance is 0:100 (comparative example 4), this will cause the following adverse effects: a. organic material is too little or there is no organic material, which is a challenge for slurry processing, too much filling substance is more difficult to be completely dissolved/suspended in the organic material, and it is difficult to form a slurry; b. too much filling substance, especially graphite-based filling substance, during charge and discharge process, a part of the lithium ions on the positive electrode will be embedded in the graphite-based filling substance in the surface layer of the lithium-supplement layer, which directly leads to the reduction of lithium ions that can be used for cycle, which ultimately affects the battery performance. When the proportion of organic material of surface layer in the lithium-supplement layer is too high, although it may be helpful for the surface layer to form an isolation layer on the surface of the lithium-supplement layer, thereby lowering the winding temperature of the lithium-supplement electrode sheet, and improving the activity of the lithium layer; however, if the proportion of the organic material is too high and it will cause: a. the isolation layer formed on the surface layer is too dense, which affects the lithium ion transmission efficiency, resulting in an increase of the battery internal resistance and affecting the battery performance; b. the surface layer contains organic material such as alcohols, if the proportion of organic materials is too high, it is easy to react with the electrolyte to form side products, thereby increasing the battery internal resistance and affecting battery performance; c. too little filling substance cannot play a role of restraining the expansion of the active substance during the cycle process, thereby affecting battery performance. When the content of the organic material in the surface layer of the lithium-supplement layer is 10%-97%, it is more conducive to ensure that the coating provides the isolation layer, reducing the winding temperature of the lithium-supplement electrode sheet, and improving the activity of the lithium layer, at the same time, the filling substance can effectively restrain the expansion of the active substance, and ultimately improve the battery performance.

From the data in Table 1 and Table 2, it can be seen that the functions and types of organic materials in the surface layer of the lithium-supplement layer. Example 5, examples 7-10 mainly use alcohols, esters and fatty acids organic materials, the main roles are: as a carrier of the filling substance to form a slurry coated on the surface of the lithium-supplement layer, as film-forming substance of the surface layer of lithium-supplement layer, so that the surface layer can form a film or evenly distributed on the surface of the transition layer and the oxide layer of the lithium-supplement layer.

From the data of example 5 and examples 11-13 in Table 1 and Table 2, it can be seen the function of filling substance in the surface layer of the lithium-supplement layer, the filling substance can be used to improve the deterioration of the cell internal resistance caused by the side reaction between the organic material and the electrolyte; the filling substance can form a network structure or a film-forming structure with the organic material, which can solve the expansion problem of the electrode sheet during the cycle process of the active substance.

From example 5 and examples 14-16 in Table 1 and Table 2, it can be seen that the main function of the oxide layer is: the oxide layer substance in the lithium-supplement layer is used to provide an additional lithium source, after injection, the lithium source can be continuously supplemented during the cycle process to improve the battery cycle performance, the oxide layer substance can provide a part of the substance for forming the transition layer, that is, an layer of inorganic SEI film is additionally formed to improve the battery cycle performance, the oxide layer substance may form a dense ($Li_2O$) or sparse ($Li_3N$) isolation layer on the surface of the electrode sheet, to further improve the problem that the winding temperature of electrode sheet of the lithium-supplement layer would be increased due to the reaction between the lithium layer and the air/active substance.

From example 5 and examples 17-20 in Table 1 and Table 2, it can be seen that: the thickness of the coating is thicker, the cell internal resistance is greater, while during the cycle process, as the lithium ion transmission efficiency becomes worse, the cycle performance will be significantly affected. When the thickness of the surface layer of the lithium-supplement layer is in the range of 0.1 μm-15 μm, the surface layer can form an isolation layer between the lithium-supplement layer and the air, at the same time, it will not significantly affect the transmission efficiency of lithium ions, due to the winding temperature of the lithium-supplement electrode sheet is controllable, the activity of the lithium-supplement layer can be guaranteed to provide capacity, and to improve the performance of the lithium ion battery.

From example 5 and examples 17-20 in Table 1 and Table 2, it can be seen that: under the same proportion of the organic material and the filling substance in the surface layer of the lithium-supplement layer: that is, when the proportions of organic material and the filling substance are the same, if the thickness of the surface layer is too small, for example, when the thickness of the surface layer is 0 μm-0.1 μm, the effective isolation layer cannot be formed on the surface of the lithium-supplement layer, resulting in an increase of the reaction area between the lithium layer and the air, which accelerates the reaction, the temperature during the winding process of the lithium-supplement electrode sheet exceeds the standard, causing production safety risks. At the same time, an over high temperature of the electrode sheet will reduce the activity of the lithium layer, a part of lithium layers will form dead lithium under high temperature condition, and cannot be used to provide capacity, resulting in a significant impact on electrical performance and reducing cycle performance.

When the thickness of the surface layer of the lithium-supplement layer is too thick, for example, the thickness of the surface layer is greater than 15 μm, since the thick surface layer can form an isolation layer to the air on the surface of the lithium-supplement layer, so that the winding temperature of the lithium-supplement electrode sheet decreases, however, if the surface layer is too thick, it will directly affect the transmission efficiency of lithium ions, it is obvious to see that: the thickness of the coating is thicker, the cell internal resistance is greater, while during the cycle process, as the lithium ion transmission efficiency becomes worse, the cycle performance will be significantly affected.

When the thickness of the surface layer of the lithium-supplement layer is in the range of 0.1p m-15p m, the surface layer can form an isolation layer between the lithium-supplement layer and the air, at the same time, it will not significantly affect the transmission efficiency of lithium ions, due to the winding temperature of the lithium-supplement electrode sheet is controllable, the activity of the lithium-supplement layer can be guaranteed to provide capacity, and to improve the performance of the lithium ion battery.

From comparative example 2, example 5 and examples 21-23 in Table 1 and Table 2, it can be seen that: the transition layer is too thin (<10 nm), the formed inorganic SEI film is too thin, cannot play a protection role for the expansion of the active substance layer itself, and the improvement of the electrical performance is not obvious, if the transition layer is too thick, it may directly affect the direct transmission efficiency of lithium ions in the positive and negative electrode sheets, further affects the battery performance.

From comparative example 2, example 5 and examples 24-28 in Table 1 and Table 2, it can be seen that: the thickness of the oxide layer is too thin (<0.5 μm), that is, under the same amount of lithium-supplement, the lithium layer is pressed to the thinnest, it can be considered that most of the lithium layer is directly pressed into the active substance layer, under this circumstance, the active substance of the electrode sheet reacts violently with the substance in the lithium-supplement layer, the heating generated is more obvious, and the winding temperature of the electrode sheet increases greatly, and affects the safety of manufacturing; at the same time, the high winding temperature of the electrode sheet directly affects the activity of the oxide layer substance, and affects the battery cycle performance. If the thickness of the oxide layer is too thick (>20 μm), that is, under the same amount of lithium-supplement, the lithium layer rarely contacts with the active substance on the surface of the electrode sheet, under this circumstance, since the oxide layer of the lithium-supplement layer rarely reacts with the active substance, and winding temperature of the lithium-supplement electrode sheet decreases; at the same time, since the thickness of the oxide layer is too thick, it will directly affect the efficiency of the oxide layer of the lithium-supplement layer embedded into the active substance, even under the circumstance of liquid injection, since the ion channels and electron channels between the oxide layer and the active substance layer are too few (the contact area between the oxide layer and the active substance layer is small), thereby affecting the battery cycle performance in a certain extent. If the thickness of oxide layer is too thick, and the contact area between the oxide layer and the active substance layer is small, leading to the thickness of the transition layer in the lithium-supplement layer is difficult to achieve an optimal window, which also affects the battery cycle performance.

Figure 2:
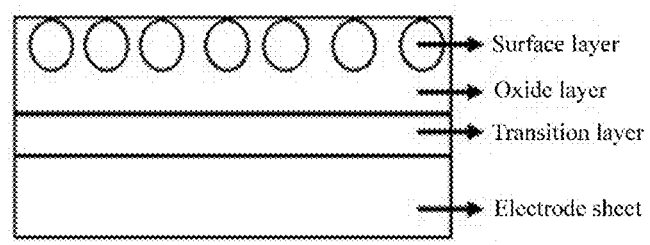
FIG. 2 is a schematic diagram of an electrode sheet of a dotted covering lithium-supplement layer of a specific embodiment.

In addition, referring to FIG. 2, the present application also provides a schematic diagram of dotted covering lithium-supplement layer, the manufacturing method of the electrode sheet is similar to the manufacturing method of the negative electrode sheet containing lithium-supplementary layer of examples 1-28 and comparative examples 1-4, except that when the surface layer is coated, uniform dot dip coating is used to make the surface layer appear dotted covering on the oxide layer.

Figure 3:
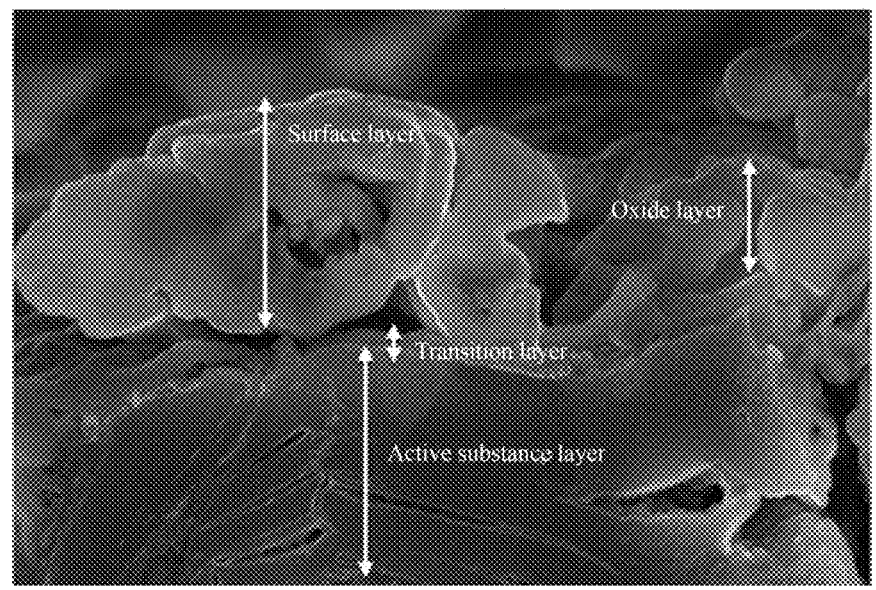
FIG. 3 is a scanning electron micrograph (SEM) of a lithium-supplement cross section of an electrode sheet after formation of lithium ion cell containing the lithium-supplement layer of a specific embodiment.

Referring to FIG. 3, the figure shows a scanning electron micrograph (SEM) of a lithium-supplement cross section of an electrode sheet after formation of lithium ion cell containing the lithium-supplement layer of the present application. The electron micrograph is the micro-morphology of the electrode sheet that after formation of the lithium ion cell produced in example 22, and it can be seen that, there is a transition layer on the upper surface of the active substance layer, through composition analysis, the main layer of the transition layer is $Li_2O$; the upper surface of the transition layer is an oxide layer, and the surface layer (organic+ inorganic particles) shows dotted covering on the oxide layer; the thickness of the oxide layer is about 2 μm, and the thickness of the surface layer is about 4 μm.

It should be noted that, although the above examples have been described herein, it is not intended to limit the patent protection scope of this application. Therefore, based on the innovative ideas of this application, changes and modifications to the examples described herein, or the equivalent structure or equivalent process transformation made by the description and drawings of this application, directly or indirectly apply the above technical solutions to other related technical fields, all are included in the scope of patent protection of this application.

The invention claimed is:

1. A lithium-supplement negative electrode sheet, comprising:
   a current collector;
   a diaphragm, located on the current collector and comprising an active substance, an adhesive and a conductive agent; and
   a lithium-supplement layer comprising:
      a transition layer on the diaphragm, wherein the transition layer is one or more selected from $Li_2O$, $Li_xC$, and $Li_{x1}Si_y$, wherein, $0<x\leq2$, $0<x1\leq4.4$, $0\leq y2$;
      an oxide layer on the transition layer, wherein the oxide layer is a lithium source selected from the group consisting of Li metal, $Li_2O$, LiF, LiOH, $Li_3N$, $Li_2CO_3$, or any combinations thereof; and
      a surface layer on the oxide layer, wherein the surface layer contains an organic material and a filling substance, the organic material is one or more selected from stearic acid, 12-hydroxystearic acid, fatty acid metal salt, polyglycol, polyhydrocarbon cyclopentane, polyisobutyl methacrylate, phosphate ester, paraffin, polyurea, poly a-olefins, alkyl naphthalene, and polydimethylsiloxane, and the filling substance is one or more selected from graphite, graphene, aluminum oxide, sodium hydroxide, lithium hydroxide, calcium hydroxide and molybdenum disulfide.

2. The lithium-supplement negative electrode sheet according to claim 1, wherein, based on a quality of the surface layer, a content of the organic material is 10%-97%;
   a content of the filling substance is 3%-90%.

3. The lithium-supplement negative electrode sheet according to claim 1, wherein, a thickness of the surface layer is 0.1 μm-15 μm.

4. The lithium-supplement negative electrode sheet according to claim 1, wherein, a thickness of the transition layer is 0.01 μm-1 μm.

5. The lithium-supplement negative electrode sheet according to claim 1, wherein, a thickness of the oxide layer is 0.5 μm-20 μm.

6. A lithium-supplement lithium ion battery, comprising:
   the lithium-supplement negative electrode sheet according to claim 1;
   a positive electrode sheet;
   an electrolyte and a separator.

7. A device comprising:
   the lithium ion battery according to claim 6.

8. The lithium-supplement negative electrode sheet according to claim 2, wherein, based on the quality of the surface layer, the content of the organic material is 20%-80%.

9. The lithium-supplement negative electrode sheet according to claim 2, wherein, based on the quality of the surface layer, the content of the filling substance is 20%-80%.

10. The lithium-supplement negative electrode sheet according to claim 3, wherein, the thickness of the surface layer is 1 μm-8 μm.

11. The lithium-supplement negative electrode sheet according to claim 4, wherein, the thickness of the transition layer is 0.05 μm-0.7 μm.

12. The lithium-supplement negative electrode sheet according to claim 5, wherein, the thickness of the oxide layer is 0.8 m-10 m.

13. The lithium-supplement negative electrode sheet according to claim 1, wherein, the surface layer is a layered covering.

14. The lithium-supplement negative electrode sheet according to claim 1, wherein, the surface layer is a dotted covering.

* * * * *